March 2, 1965    W. L. BROWN    3,171,910
DIRECTIONAL SIGNALING APPARATUS HAVING TWO ELECTRICALLY
ISOLATED SWITCH ELEMENTS EACH ENGAGEABLE
WITH PAIRS OF CONTACTS
Filed Aug. 14, 1961    3 Sheets-Sheet 1

INVENTOR.
WILLIAM L. BROWN
BY
*Learman, Learman & McCulloch*
ATTORNEYS

March 2, 1965 W. L. BROWN 3,171,910
DIRECTIONAL SIGNALING APPARATUS HAVING TWO ELECTRICALLY
ISOLATED SWITCH ELEMENTS EACH ENGAGEABLE
WITH PAIRS OF CONTACTS
Filed Aug. 14, 1961 3 Sheets-Sheet 2

INVENTOR.
WILLIAM L. BROWN
BY
*Learman, Learman & McCulloch*
ATTORNEYS

INVENTOR.
WILLIAM L. BROWN
BY
ATTORNEYS

United States Patent Office 3,171,910
Patented Mar. 2, 1965

3,171,910
DIRECTIONAL SIGNALING APPARATUS HAVING TWO ELECTRICALLY ISOLATED SWITCH ELEMENTS EACH ENGAGEABLE WITH PAIRS OF CONTACTS
William L. Brown, Garden City, Mich., assignor to Boyne Products, Inc., Boyne City, Mich., a corporation of Michigan
Filed Aug. 14, 1961, Ser. No. 131,243
10 Claims. (Cl. 200—61.34)

This invention relates to direction signaling apparatus for use on motor vehicles and more particularly to semi-automatic signaling apparatus of the kind manually actuated by a vehicle driver so as to indicate either a left hand or a right hand turn and automatically canceled upon the completion of the turn.

Apparatus of the general class to which the invention relates is in wide usage in the automotive field and usually makes use of a vehicle's brake actuated stop lamp and parking lamp circuitry for simultaneously flashing the stop lamp and the parking lamp at one side or the other of the vehicle for indicating either a left hand or right hand turn. Under normal driving conditions both the left and right hand stop lamps of a vehicle are illuminated whenever the brake pedal is depressed, and the left and right hand parking lamps are illuminated only when a switch for that purpose is closed. In order for the direction signaling apparatus to function properly, therefore, one of the stop lamps must be disconnected from the brake actuated switch and one of the parking lamps must be activated when the direction signaling apparatus is adjusted to indicate a turn.

The prior art contains many proposals for indicating turns and which operate on principles similar to those discussed hereinabove. Many of the prior art devices have enjoyed considerable success, but one difficulty with most of the prior art devices has been the necessity of using a fairly large number of parts. The use of multiple parts is objectionable inasmuch as it necessitates multiple manufacturing operations, requires considerable time and dexterity in assembly, and increases the likelihood of failure of the direction signaling apparatus. In addition, direction signaling devices must fit within rather restricted areas requiring many of the parts to be fairly small, thereby multiplying the problems referred to above.

Another disadvantage of the use of multiple small parts is the difficulty in providing sufficient movement of the parts relative to the switch contacts as to assure good wiping characteristics of those contacts. Good wiping characteristics are essential if electrical difficulties are to be avoided or minimized for any appreciable length of time.

An object of the present invention is to provide direction signaling apparatus which is composed of relatively few parts compared to similar devices in use heretofore.

Another object of the invention is to provide apparatus of the kind referred to having its components, for the most part, considerably larger than parts heretofore used in direction signaling devices.

A further object of the invention is to provide direction signaling apparatus which inherently provides excellent wiping characteristics between the electrically conductive parts.

Another object of the invention is to provide improved direction signaling apparatus of the character described which is economical to manufacture, easily serviced when required, and rugged in use.

Other objects and advantages of the invention will be pointed out in detail or will become apparent from the following description when it is considered in conjunction with the appended claims and the accompanying drawings, in which:

Figure 1:
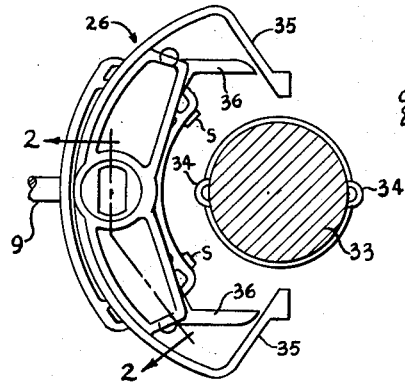
FIGURE 1 is a plan view of an assembled direction signaling device constructed in accordance with the invention and illustrating its relationship to the steering shaft of a vehicle, the shaft being shown in section.

Apparatus constructed in accordance with the invention has many characteristics which are similar to the apparatus disclosed in copending application Serial No. 797,266, filed March 4, 1959, now Patent No. 2,999,911, and the apparatus herein disclosed constitutes an improvement over the construction disclosed in that patent.

The embodiment of the invention disclosed in FIGURES 1-4 comprises a switch casing 1 that preferably is molded from a suitable non-conductive plastic such as nylon and has a base 2 defined by upstanding side and end walls 3 and 4, respectively. Extending outwardly from the center of the casing is an annular boss 5. A concentric, reduced diameter boss 5a projects inwardly of the casing from the base 2. The switch casing is adapted to be mounted on a suitable support (not shown) and the base 2 may be provided with openings 6, or any other suitable means, adapted to receive screws (not shown) or the like so as to fix the casing on its support. The bosses 5 and 5a are provided with a central opening 7 of such shape as rockably to receive a flat sided operating stem or shaft 8 to which is connected an operating lever 9 (FIGURE 1) that is adapted to be manipulated by the vehicle driver to indicate either a left hand or right hand turn.

A plurality of sets of electrically conductive contacts is fixed in the base of the switch casing and conveniently may be formed of copper or copper-beryllium alloy rivets. One set of contacts is indicated by the reference characters 10 and 10a and another set of contacts is indicated by the reference characters 11 and 11a. The contacts 10, 10a and 11, 11a are arranged on the arc of a circle having its center at the center of the hub 5a for a purpose presently to be explained.

Also mounted in the switch casing is another set of electrically conductive contacts 12 and 13. The contacts 12 and 13 also may be formed of rivets of the kind referred to above and the head of the contact 12 preferably is located at a higher level above the switch base 2 than is the head of the contact 13 for a reason which will be explained hereinafter. The boss 5a may be cut away as at 14 and 15 to accommodate the respective contacts 12 and 13.

Within the switch casing 1 is mounted a pair of electrically conductive switching members 16 and 17 that are electrically isolated from one another. The switching member 16 comprises a generally horseshoe-shaped mounting hub 18 which is loosely mounted on the boss 5a so as to be capable of rocking back and forth relatively thereto. The member 16 includes a pair of substantially radially projecting switch arms 19 and 20 which, in their normal positions, lie between the switch contacts 10, 11 and 10a, 11a, respectively, so as to be free of engagement with both sets of contacts.

The switching member 17 comprises an annular mounting ring 21 that is loosely mounted on the boss 5a and it too includes two radiating switch arms 22 and 23 which are circumferentially spaced from the arms 19 and 20 so that, in their normal or neutral positions, they engage the contacts 10 and 10a, respectively, of the first set of switch contacts.

Figure 2:
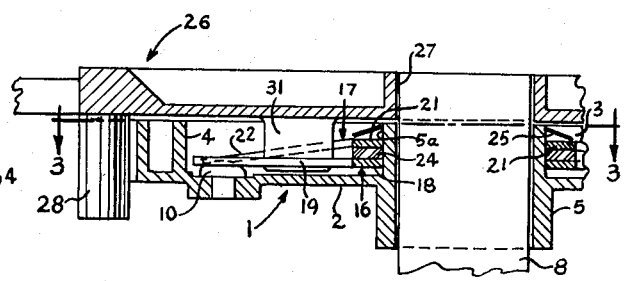
FIGURE 2 is a fragmentary, enlarged sectional view taken on the line 2—2 of FIGURE 1.

As is best shown in FIGURE 2, the hub 18 of the switching member 16 is mounted at a level closer to the casing base 2 than is the hub 21 of the switching member 17. The hub of the member 16 slideably bears against the contact 13, and its arms 19 and 20 are located at a level to cause them to be lightly spring-loaded when the member 16 is rocked to such a position as to permit the arms 19 and 20 to engage any of the contacts adjacent the ends of the switch casing. Because of the horseshoe-shaped configuration of the mounting hub 18, the switch member 16 can be rocked back and forth from the position shown in FIGURE 3 without interference with the switch contact 12.

The mounting hub 21 of the switching element 17 is located at a higher level than the member 16 so as to permit it slideably to engage the contact 12. The switch arms 22 and 23 are bent toward the casing base 2 so that their ends lie in substantially the same plane as the arms 19 and 20, and the arms 22 and 23 also will be lightly spring-biased when they engage the contacts 10 and 10a, respectively. The switching members 16 and 17 are insulated or isolated from one another by means of a horseshoe-shaped insulating element 24 interposed between the mounting hubs 18 and 21, and the members 16 and 17 are maintained in assembled relation with the insulator 24 by means of a spring washer 25 mounted on the boss 5 and bearing against the switch member 17.

The length of each of the arms of the switching members corresponds substantially to the radius on which the switch contacts 10, 10a and 11, 11a are arranged so that the contacts can be engaged by the arms upon rocking of the latter. The width of each arm corresponds substantially to the diameter of the switch contacts, and the arrangement of the member 17 is such that, in its neutral position, its arms 22 and 23 engage only about half the surface of the associated contacts.

Mounted atop the switch casing 1 is an actuating member 26 formed of molded, nonconductive plastic material such as nylon. The actuating member comprises an arcuate body having a centrally formed opening of a size and shape corresponding substantially to the size and shape of the operating shaft 8 so that rocking of the post 8 will cause corresponding rocking of the actuating member 26. Adjacent each end of the body portion of the actuating member is an integral, depending post 28 which cooperates with an integral, flexible rib 29 formed at each end of the switch casing 1 for yieldably maintaining the actuating member in any position to which it has been rocked. The ribs 29 include centrally located detent portions 30 which receive the posts 28 when the actuating member is in its neutral position.

The actuating member 26 includes means for effecting operation of the switching members 16 and 17 in response to rocking movements of the actuating member. In the embodiment of the invention disclosed in FIGURES 1–4, the switch actuating means comprises a molded, integral, depending finger 31 carried by the actuating member at one side of its axis of rocking movement and a similar finger 32 at the other side of its axis. The fingers 31 and 32 extend into the switch casing and are substantially triangularly shaped, in cross-section, so as to fit between the arms 19, 22 and 20, 23, respectively, of the switching members 16 and 17. The construction and arrangement of the parts are such that the switching members 16 and 17 are incapable of moving relatively to the switch casing or to the actuating except when the actuating member is rocked in one direction or the other. Upon rocking of the actuating member, the switching members 16 and 17 will move relatively to the switch casing, but cannot move relatively to the actuating member.

When the apparatus described thus far is conditioned for operation, the switch casing 1 will be fixed on a suitable support (not shown) adjacent the steering shaft 33 of an automotive vehicle. The shaft 33 may be provided with one or more cams 34 which project radially from the shaft and rotate with the latter. The actuating member 26 is provided at opposite ends of its body with integral, molded return fingers 35 which normally are free of engagement with the cams 34 when the actuating member is in its neutral position. Upon rocking of the actuating member to either of its actuating positions, one of the arms 35 will be located in the path of rotation of a cam 34 and, upon rotation of the shaft in one direction or the other, the appropriate finger 35 will be forced against an abutment 36 forming an integral part of the actuating member and restore the actuating member to its neutral position in exactly the same manner as is more fully explained in the above identified patent.

Figure 3:
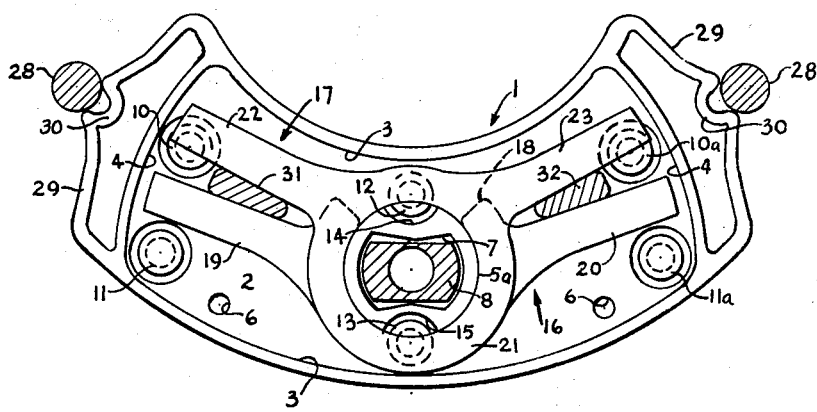
FIGURE 3 is a sectional view taken on the line 3—3 of FIGURE 2 and illustrating the arrangement of the electrically conductive parts within the switch casing when the apparatus is in its neutral position.
Figure 4:
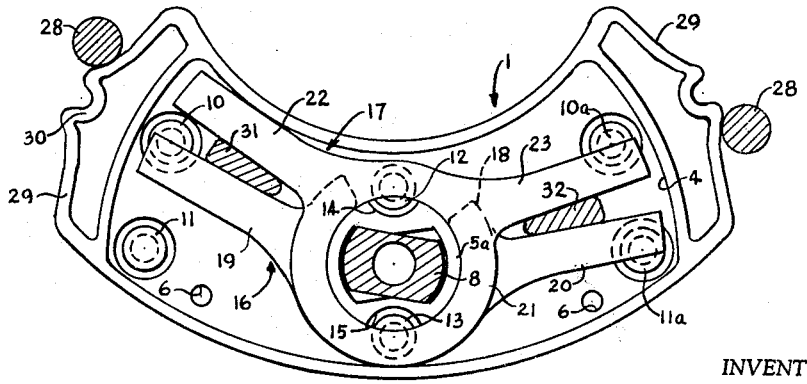
FIGURE 4 is a view similar to FIGURE 3, but showing the parts in an actuated position.
Figure 8:
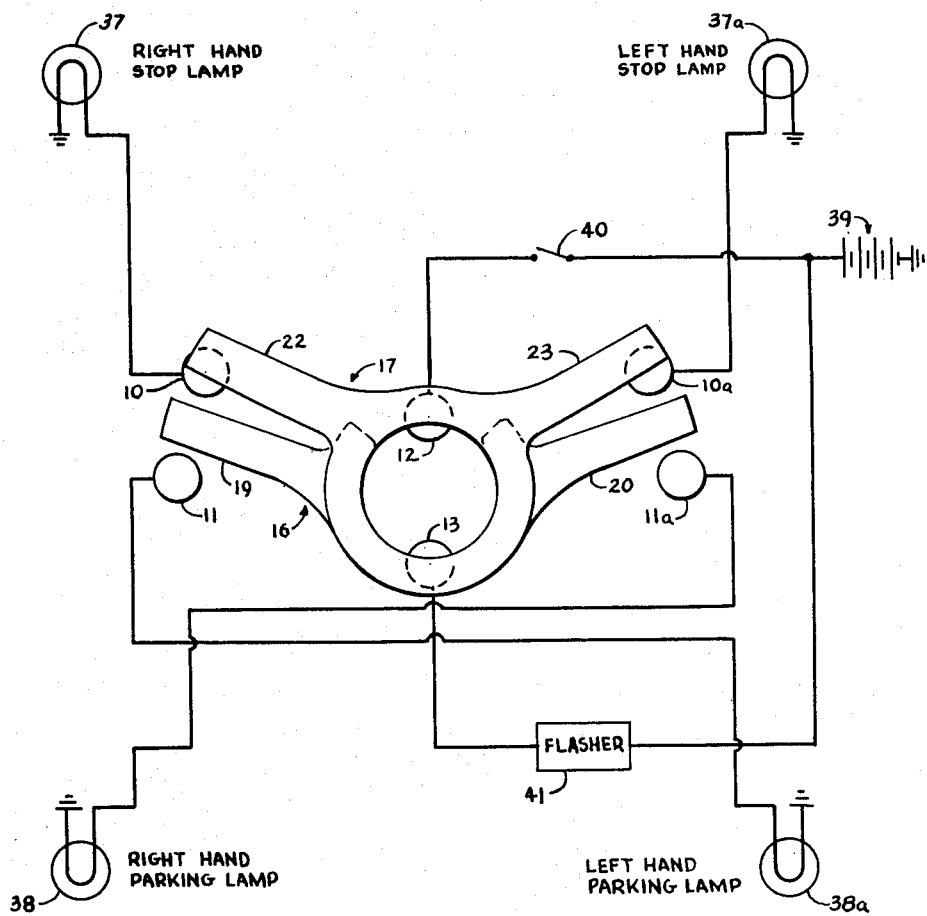
FIGURE 8 is a schematic wiring diagram adapted for use with either of the disclosed embodiments of the apparatus.

The operation of the apparatus thus far disclosed can best be described by referring to FIGURES 3, 4, and 8. As is illustrated in FIGURE 8, the set of contacts 10, 10a are connected respectively to right hand and left hand stop lamps 37 and 37a which conventionally are furnished on motor vehicles. The contacts 11 and 11a are respectively connected to left and right hand parking lamps 38 and 38a, which also conventionally are provided on motor vehicles.

The contact 12 is connected to a battery 39 or other source of electric energy through a switch 40 that is adapted to be closed whenever the vehicle's brake mechanism is actuated. Closing of the switch 40, when the switch member 17 is in the position shown in FIGURES 3 and 8, will permit an electric current to flow from the battery 39 to the contact 12, and through the switch arms 22 and 23 to the contacts 10 and 10a so as to effect continuous illumination of the stop lamps 37 and 37a as long as the brake mechanism remains actuated.

The contact 13 is connected to the battery 39 through a flasher unit 41 of known construction. Normally, i.e., when the actuating member is in its neutral position, no current flows through the flasher inasmuch as the switch arms 19 and 20 are disengaged from both sets of switch contacts.

Should the vehicle driver desire to indicate a right hand turn, for example, the operating lever 9 will be rocked clockwise, as viewed in FIGURE 1, so as to cause the actuating member 26 to be rocked in a clockwise direction a distance slightly more than half the diameter of the contacts 10, 10a. Rocking of the actuating member clockwise will cause the operating finger 31 to shift the switch arms 22 and 23 from the positions shown in FIGURE 3 to the positions shown in FIGURE 4, and will cause the finger 32 to shift the switch arms 19 and 20 from the positions shown in FIGURE 3 to the positions shown in FIGURE 4. In these positions of the switch arms, the contact 10 will be disengaged by the switch arm 22, but the throw of the actuating member 26 is not sufficiently great to cause disengagement between the arm 23 and the contact 10a. However, the throw of the actuating member is sufficiently great to cause engagement between the switch arm 19 and the contact 10 and engagement between the switch arm 20 and the contact 11a, as is shown in FIGURE 4. The throw of the actuating member may be limited in any suitable manner, such as by engaging upstanding stops S (FIGURE 1) molded on the casing in the path of movement of the actuator.

In the actuated positions of the parts, closing of the switch 40 will enable the left hand stop lamp 37a to glow steadily, inasmuch as a circuit is completed from the battery through the switch 40 to the contact 12, and from the contact 12 to the contact 10a through the switch arm 23. Since the switch arm 22 has been disengaged from the contact 10, however, closing of the switch 40 has no effect on the right hand stop lamp 37. In the adjusted position of the switch member 16, a circuit to the contact 10 is completed to the battery 39 through the switch arm 19, the contact 13 and the flasher unit 41. A circuit from the battery 39 and through the flasher 41 also is made to the right hand parking lamp 38 through the contact 13, the switch arm 20 and the contact 11a. Thus, the right hand stop lamp 37 and the right hand parking lamp 38 will flash on and off so as to indicate a turn to the right.

When the turn has been completed, one of the cams 34 on the steering shaft 33 will engage the appropriate return finger 35 of the actuating member and restore it, and the switching members 16 and 17, to their neutral positions as shown in FIGURE 3.

Should the vehicle driver wish to indicate a turn to the left, the operation of the apparatus will be the same as has been described above, with the exception that the switching members 16 and 17 will be moved from their positions shown in FIGURE 3 in a direction counter-clockwise so as to cause flashing of the left hand stop lamp and parking lamp.

Figure 5:
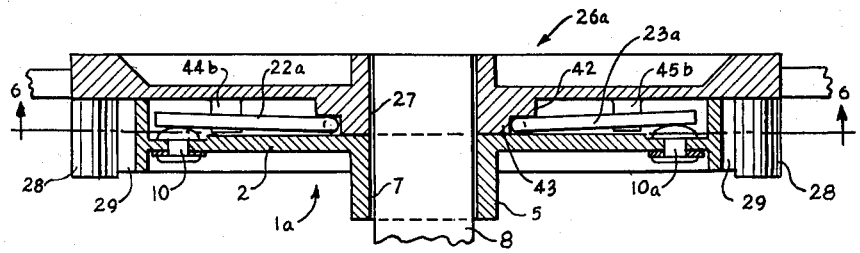
FIGURE 5 is a view similar to FIGURE 2, but illustrating a modified form of the invention.
Figure 6:
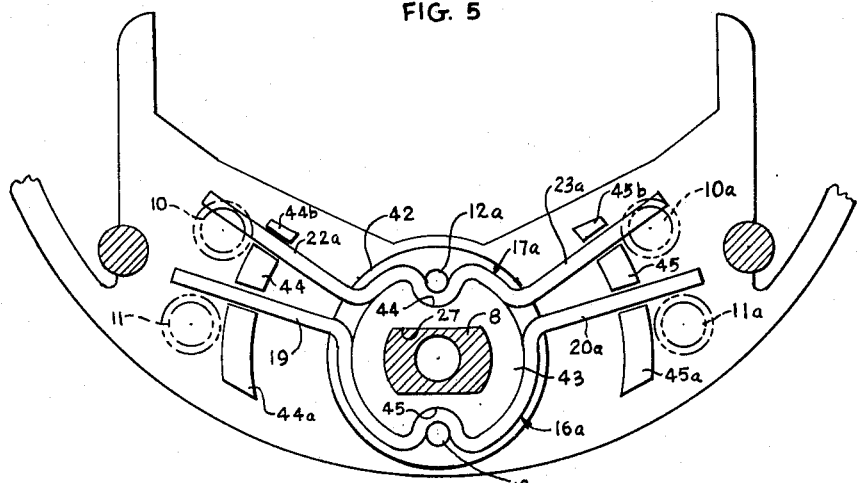
FIGURE 6 is a sectional view taken on the line 6—6 of FIGURE 5 and illustrating the arrangement of the electrically conductive parts in their neutral position.
Figure 7:
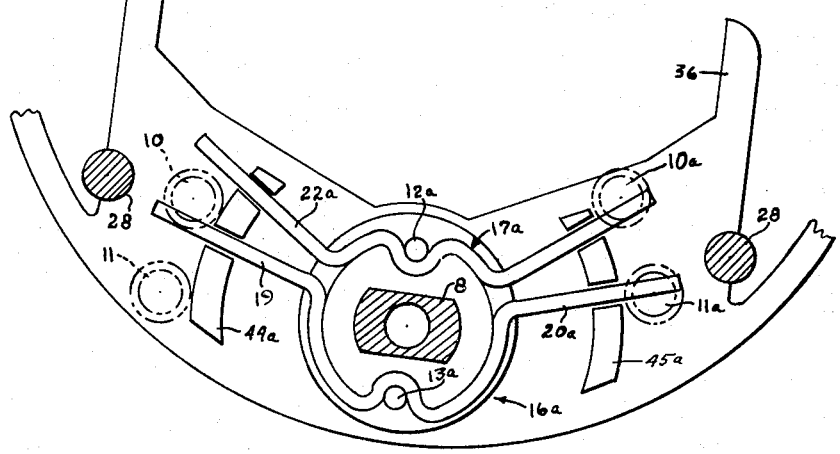
FIGURE 7 is a view similar to FIGURE 6, but illustrating the parts in an actuated position.

The embodiment of the invention disclosed in FIGURES 5, 6 and 7 is similar to the embodiment just described and operates in a similar manner, but there are certain significant differences which will be described. Those parts of the apparatus which are like corresponding parts of the previously described embodiment are identified by the same reference characters. The apparatus shown in FIGURES 5-7 includes a switch casing 1a which may be the same as the casing 1 except that the switch casing 1a does not include the interior boss 5a. The casing 1a does, however, include the switch contacts 10, 10a and 11, 11a and arranged in the same manner as the corresponding contacts in the switch casing 1.

In the modified embodiment of the invention, an actuating member 26a is provided with a central boss 42 that surrounds the opening 27 through which the operating post 8 extends, and the boss 42 terminates in a reduced diameter boss 43 which is adapted to bear against the base 2 of the switch casing 1a. Fixed in the boss 43 is a pair of diametrically opposed switch contacts 12a and 13a, corresponding to the switch contacts 12 and 13, respectively. Adjacent the contact 12a the boss 43 is provided with an arcuate notch 44. A similar notch 45 is formed in the boss 43 adjacent the contact 13a. Fitted in the notch 45, and in engagement with the contact post 13a, is a switching member 16a formed of beryllium-copper wire, of circular cross-section and having a pair of contact arms 19a and 20a. Fitted in the notch 44 and in engagement with the contact post 12a is a similar switching member 17a having switch arms 22a and 23a. The switching members 16a and 17a are located in substantially the same plane, but their arms are circumferentially spaced apart so as to isolate the switching members from one another.

Integrally formed on the inner surface of the actuating member 26a is a pair of stabilizing fingers 44 and 45, the finger 44 being located between the contact arms 19a and 22a and the finger 45 being located between the contact arms 20a and 23a. Preferably, stabilizing ribs 44a and 44b are integrally formed on the actuating member 26a and are positioned adjacent the arms 19a and 22a, respectively, so as to prevent undue deflection of the latter. Similar ribs 45a and 45b may be associated with the contact arms 20a and 23a, respectively.

The operation of the apparatus shown in FIGURES 5-7 is similar to operation of the earlier described embodiment, the principal difference being that the switching members 16a and 17a are carried by and rock with the actuating member 26a whenever the latter is moved from its neutral position to and from either of its operating positions. When the actuating member is in its neutral position the switch members 16a and 17a will be in the positions indicated in FIGURE 6, the switch contacts carried by the casing being indicated in phantom lines. When the actuating member is moved to one of its turn indicating positions the switch members 16a and 17a will move with the latter so as to shift the switching members relatively to the contacts 10, 10a and 11, 11a as is illustrated in FIGURE 7.

The same circuit disclosed in FIGURE 8 can be utilized with the embodiment of the invention shown in FIGURES 5-7. Accordingly, it is not considered necessary to show a wiring diagram for the latter embodiment.

In both embodiments of the invention, all parts of the apparatus are fairly large in comparison to the sizes of parts heretofore used in direction signaling apparatus. Consequently, fabrication and assembly of the parts of the apparatus are facilitated. Moreover, both embodiments of the invention utilize fewer parts than heretofore have been used in semi-automatic signaling devices, thereby making it possible to effect savings in the manufacture and assembly of the apparatus. In both embodiments of the invention, operation of the actuating member effects wiping of the arms of the switch members and the contacts carried by the casing so as to maintain the contact parts clean and bright, thereby assuring good electrical operating characteristics for the apparatus.

The disclosed embodiments are representative of presently preferred forms of the invention, but are intended to be illustrative ratehr than definitive thereof. The invention is defined in the claims.

I claim:

1. Direction signaling apparatus for use with cam means movable in a rotary path, said apparatus comprising a switch casing member; an arcuately shaped actuating member terminating at its ends in return fingers; means mounting said actuating member on said casing member for rocking movement about an axis in either of two opposite directions from a neutral position in which said fingers are clear of the path of said cam means to either of two operating positions on opposite sides respectively of said neutral position, and in which one or the other of said fingers is in the path of said cam means; a first pair of switch contacts on one of said members comprising a first contact located adjacent one end of said actuating member and a second contact located adjacent the other end of said actuating member; a second pair of switch contacts on said one of said members comprising a first contact located adjacent said one end of said actuating member and a second contact located adjacent the other end of said actuating member, the contacts of said pairs of contacts at corresponding ends of said actuating member being spaced from one another; a switching element interposed between said members and being of such length as to span the distance from the first contact of each pair of contacts to the second contact of each pair of contacts, said switching element lying between and being disengaged from the contacts of both of said pairs of contacts when the actuating member is in the neutral position; means interconnecting said actuating member and said switching element for moving the latter in response to rocking movement of said actuating member from the said neutral position to either of the said operating positions; and means for limiting rocking movement of the actuating member in either of said directions from its neutral position to that amount necessary to effect engagement between one contact of each pair of switch contacts and said switching element.

2. Direction signaling apparatus for use with cam means movable in a rotary path, said apparatus comprising a switch casing member; an arcuately shaped actuating member terminating at its ends in return fingers; means mounting said actuating member on said casing member for rocking movements about an axis from a neutral position in which said fingers are clear of the path of said cam means to either of two operating positions on opposite sides respectively of said neutral position, and in which one or the other of said fingers is in the path of said cam means; a first pair of switch contacts on one of said members comprising a first contact located adjacent one end of said actuating member and a second contact located adjacent the other end of said actuating member; a second pair of switch contacts on said one of said members comprising a first contact located adjacent said one end of said actuating member and a second contact located adjacent the other end of said actuating member, the contacts of said pairs of contacts being spaced from each other; a first switching element interposed between said members and being of such length as to span the distance from the first contact of said first pair of contacts to the second contact of said first pair of contacts, said first switching element being in engagement with the first and second contacts of the first pair of contacts but disengaged from the first and second contacts of the second pair when said actuating member is in said neutral position; a second switching element electrically isolated from said first switching element interposed between said members and being of such length as to span the distance from the first contact of each pair of contacts to the second contact of each pair of contacts, said second switching element being disengaged from the contacts of the first and second pairs of contacts when the actuating member is in said neutral position; means interconnecting said actuating member and said switching elements for moving the latter in response to rocking movement of the actuating member from said neutral position to either of the operating positions; and means for limiting rocking movements of the actuating member from said neutral position to that amount necessary to effect disengagement between one only of the first pair of contacts and the first switching element, and to effect engagement between one contact of each pair of switch contacts and the second switching element.

3. Apparatus as set forth in claim 2 wherein said switching elements are mounted on said casing member.

4. Apparatus as set forth in claim 2 wherein said switching elements are mounted on said actuating member.

5. Apparatus as set forth in claim 3 wherein said first and second switching elements have first portions mounted one above the other and other portions thereof lying substantially in the same plane.

6. Apparatus as set forth in claim 5 including insulating means interposed between said first portions of said switching elements and wherein said other portions thereof are circumferentially spaced from one another.

7. Apparatus as set forth in claim 2 wherein said first and second switching elements are mounted in the same plane and are circumferentially spaced apart from one another.

8. Apparatus as set forth in claim 2 wherein said actuating member and each of said switching elements are rockable about a common axis.

9. Direction signaling apparatus comprising a switch casing member; an arcuately shaped actuating member having terminal ends; means mounting said actuating member on said casing member for rocking movement about an axis in either of two opposite directions from a neutral position to either of two operaing positions on opposite sides respectively of said neutral position; a first pair of switch contacts on one of said members comprising a first contact located adjacent one end of said actuating member and a second contact located adjacent the other end of said actuating member; a second pair of switch contacts on said one of said members comprising a first contact located adjacent said one end of said actuating member and a second contact located adjacent the other end of said actuating member, the contacts of said pairs of contacts at corresponding ends of said actuating member being spaced from one another; a switching element interposed between said members and being of such length as to span the distance from the first contact of each pair of contacts to the second contact of each pair of contacts, said switching element lying between and being disengaged from the contacts of both of said pairs of contacts when the actuating member is in the neutral position; means interconnecting said actuating member and said switching element for moving the latter in response to rocking movement of said actuating member from the said neutral position to either of the said operating positons; and means for limiting rocking movement of the actuating member in either of said directions from its neutral position to that amount necessary to effect engagement between one contact of each pair of switch contacts and said switching element.

10. Direction signaling apparatus comprising a switch casing member; an arcuately spaced actuating member having terminal ends; means mounting said actuating member on said casing member for rocking movements about an axis from a neutral position to either of two operating positions on opposite sides respectively of said neutral position; a first pair of switch contacts on one of said members comprising a first contact located adjacent one end of said actuating member and a second contact located adjacent the other end of said actuating member; a second pair of switch contacts on said one of said members comprising a first contact adjacent said one end of said actuating member and a second contact located adjacent the other end of said actuating member, the contacts of said pairs of contacts at corresponding ends of said actuating member being spaced from each other; a first switching element interposed between said members and being of such length as to span the distance from the first contact of said first pair of contacts to the second contact of said first pair of contacts, said first switching element being in engagement with the first and second contacts of the first pair of contacts but disengaged from the first and second contacts of the second pair when said actuating member is in said neutral position; a second switching element interposed between said members and being of such length as to span the distance from the first contact of each pair of contacts to the second contact of each pair of contacts, said second switching element lying between and being disengaged from the contacts of the first and second pairs of contacts when the actuating member is in said neutral position; means interconnecting said actuating member and said switching elements for moving the latter in response to rocking movement of the actuating member from said neutral position to either of the operating positions; and means for limiting rocking movements of the actuating member from said neutral position to that amount necessary to effect disengagement between one only of the first pair of contacts and the first switching element, and to effect engagement between one contact of each pair of switch contacts and the second switching element.

References Cited in the file of this patent
UNITED STATES PATENTS

| 1,884,117 | Mortesen | Oct. 25, 1932 |
| 2,007,084 | Haines | July 2, 1935 |
| 2,194,210 | Nesson | Mar. 19, 1940 |
| 2,607,864 | Hollins | Aug. 19, 1952 |
| 2,999,911 | Dryer et al. | Sept. 12, 1961 |